E. SIMS.
BARBED IRON FENCE.

No. 178,195. Patented May 30, 1876.

Witnesses: Inventor
Elijah Sims
by Johnson and Johnson
Attys

UNITED STATES PATENT OFFICE.

ELIJAH SIMS, OF AURORA, ILLINOIS.

IMPROVEMENT IN BARBED-IRON FENCES.

Specification forming part of Letters Patent No. 178,195, dated May 30, 1876; application filed April 8, 1876.

*To all whom it may concern:*

Be it known that I, ELIJAH SIMS, of Aurora, in the county of Kane and State of Illinois, have invented certain new and useful Improvements in Iron Barbed Fences, of which the following is a specification:

My invention relates to the construction of a barbed fence-bar. The fence itself is constructed in a manner familiar to those skilled in the art.

Figure 1:
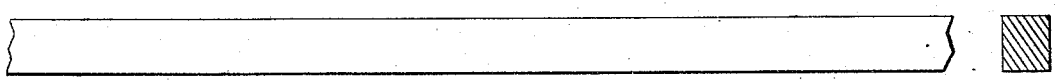
Figure 2:
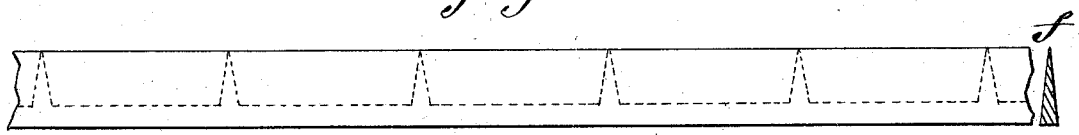
Figure 3:
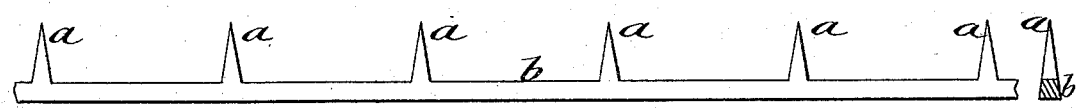
Figure 4:
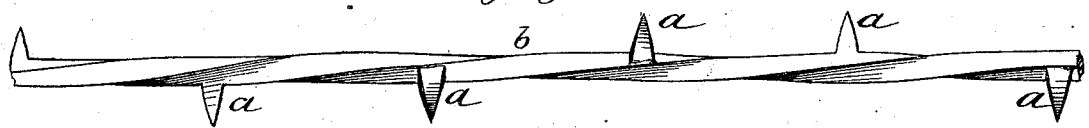
Figure 5:

In the accompanying drawings, Figure 1 represents a view of a blank or bar of iron from which my fence-bar is rolled. Fig. 2 represents the shape assumed after passing through first process of rolling. *f* represents a cross-section of same. Fig. 3 represents the bar and barbs before being twisted. Fig. 4 represents the barbed twisted fence-bar ready for use, and Fig. 5 a cross-section of same.

I take a bar of iron of suitable size, as represented by Fig. 1, heat and pass it through the rolls of rolling-mill, and give it the shape represented by Fig. 2. It then passes immediately into and through a machine, which I call my "barb-cutter," which receives it from the rolls, and gives the shape represented by Fig. 3. The barbs *a* are cut and pointed while passing through this machine. The barbed bar *b*, now formed, passes at once into a machine, which twists the barbed bar, so that barbs project in all directions in a spiral line around the bar.

The cutting of the barbs and twisting the bar can be done rapidly. If it is desired to pass a dozen bars through the rolling-mill at one time, the barbs can be cut and bars twisted with like rapidity, making the manufacture rapid and comparatively inexpensive.

My fence-bar is produced as above stated, which rolls the original bar into proper shape, cuts the sharp barbs and twists the bar by a continuous varied process, from the heated bar to completion.

I furnish by this means a perfectly strong bar, which is twisted for the double purpose of rendering it stronger to resist strain, and for obtaining a spiral line of barbs projecting in all directions.

In Fig. 2, I have shown the bar beveled or wedge-shaped in cross-section along its whole length, to give the advantage of sharp points to the barbs, which are formed by cutting out, at intervals, the metal from one side of the bar, and left to project from one side of the bar at suitable distances apart.

The twisted barbed fence-bars are made in sections of sixteen or twenty feet, or any desired length.

As I propose to patent the herein-referred-to machinery, by which I produce my new twisted barbed fence-bar, a description of such machinery is deemed unnecessary here, and I make no claim thereto in this specification.

I claim—

1. The metallic fence-rod *b*, having plane faces, and provided with barbs *a*, integral therewith, all projecting from one face, said rod twisted to arrange the barbs spirally around it, as herein set forth.

2. A twisted barbed fence-bar, the barbs being at intervals upon one side of a plane-faced bar, tapering or wedge-shaped in its cross-section, and pointed, substantially as herein set forth.

In testimony whereof I have affixed my signature in the presence of two witnesses.

ELIJAH SIMS.

Witnesses:
ROBERT C. ALLEN,
MILTON Z. SIMS.